(12) United States Patent
Rostykus et al.

(10) Patent No.: US 12,081,727 B2
(45) Date of Patent: Sep. 3, 2024

(54) HEAD-MOUNTABLE DISPLAY DEVICE AND METHOD FOR DISPLAYING AN IMAGE RECEIVED FROM A MICROSCOPE

(71) Applicant: Leica Instruments (Singapore) Pte. Ltd., Singapore (SG)

(72) Inventors: Manon Rostykus, Vulliens (CH); Robert Paulus, Hergatz (DE); Christian Marte, Dornbirn (AT); Gianluca Pargaetzi, Horn (CH)

(73) Assignee: Leica Instruments (Singapore) Pte Ltd., Singapore (SG)

( * ) Notice: Subject to any disclaimer, the term of this patent is extended or adjusted under 35 U.S.C. 154(b) by 0 days.

(21) Appl. No.: 17/998,046

(22) PCT Filed: May 6, 2021

(86) PCT No.: PCT/EP2021/062027
§ 371 (c)(1),
(2) Date: Nov. 7, 2022

(87) PCT Pub. No.: WO2021/224404
PCT Pub. Date: Nov. 11, 2021

(65) Prior Publication Data
US 2023/0209038 A1    Jun. 29, 2023

(30) Foreign Application Priority Data
May 7, 2020   (DE) .................. 102020112383.3

(51) Int. Cl.
*H04N 13/344*     (2018.01)
*G02B 13/00*      (2006.01)
(Continued)

(52) U.S. Cl.
CPC ....... *H04N 13/344* (2018.05); *G02B 13/0035* (2013.01); *G02B 15/143105* (2019.08);
(Continued)

(58) Field of Classification Search
CPC .. H04N 13/344; H04N 13/194; H04N 13/327; G02B 13/0035; G02B 15/143105;
(Continued)

(56) References Cited

U.S. PATENT DOCUMENTS

| 5,067,804 A | 11/1991 | Kitajima et al. |
| 5,949,388 A | 9/1999 | Atsumi et al. |

(Continued)

FOREIGN PATENT DOCUMENTS

| CN | 209301314 U | 8/2019 |
| DE | 102005054183 A1 | 5/2007 |

(Continued)

*Primary Examiner* — Amit Chatly
(74) *Attorney, Agent, or Firm* — 2SPL Patent Attorneys PartG mbB; Yong Beom Hwang

(57) ABSTRACT

A head-mountable display device for displaying an image received from a microscope comprises a first display configured to display a first image of a part of an object, the first image received from a microscope. Further, the head-mountable display device comprises a first optical arrangement located in front of the first display. The first optical arrangement comprises at least one lens. Additionally, the head-mountable display device comprises a mounting structure configured to fasten the first display to the head of a user. The head-mountable display device is configured to allow a direct line of sight from a first eye of the user to the object in a field of view of the user outside of the first display while the user is watching the first display through the first optical arrangement, if the mounting structure is fastened to the head of a user. An angle between a display direction and the direct line of sight is less than 50° and the display direction is orthogonal to the first display.

22 Claims, 11 Drawing Sheets

(51) Int. Cl.
    *G02B 15/14*     (2006.01)
    *G02B 21/36*     (2006.01)
    *H04N 13/194*     (2018.01)
    *H04N 13/327*     (2018.01)

(52) U.S. Cl.
    CPC ......... *G02B 21/368* (2013.01); *H04N 13/194* (2018.05); *H04N 13/327* (2018.05)

(58) Field of Classification Search
    CPC . G02B 21/368; G02B 27/017; G02B 21/0012
    See application file for complete search history.

(56) References Cited

U.S. PATENT DOCUMENTS

| | | | |
|---|---|---|---|
| 10,055,887 B1* | 8/2018 | Gil | G06F 1/163 |
| 10,600,352 B1 | 3/2020 | Wheelwright et al. | |
| 2015/0173846 A1 | 6/2015 | Schneider et al. | |
| 2017/0243499 A1* | 8/2017 | Maruyama | G06F 3/015 |
| 2017/0322410 A1 | 11/2017 | Watson et al. | |
| 2017/0371147 A1* | 12/2017 | Cao | G02B 13/002 |
| 2018/0213212 A1* | 7/2018 | Liu | H04N 13/344 |
| 2018/0348524 A1 | 12/2018 | Blum et al. | |
| 2019/0201161 A1* | 7/2019 | Yu | A61B 90/50 |

FOREIGN PATENT DOCUMENTS

| | | |
|---|---|---|
| JP | 2002262196 A | 9/2002 |
| JP | 3599854 B2 | 12/2004 |
| JP | 2006284877 A | 10/2006 |
| JP | 2012022255 A | 2/2012 |
| JP | 2016051102 A | 4/2016 |
| JP | 2017003763 A | 1/2017 |
| JP | 2017535207 A | 11/2017 |
| JP | 2018-133768 A | 8/2018 |
| JP | 2019102993 A | 6/2019 |
| JP | 2019516138 A | 6/2019 |
| WO | 2014127004 A1 | 8/2014 |
| WO | 2017079985 A1 | 5/2017 |
| WO | 2018138653 A1 | 8/2018 |

* cited by examiner

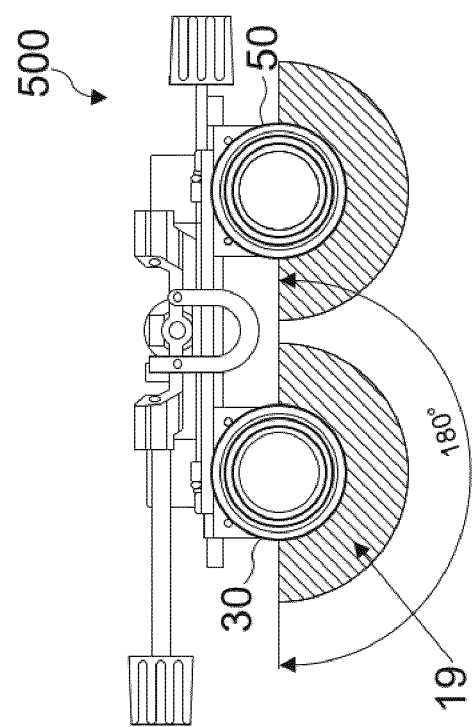
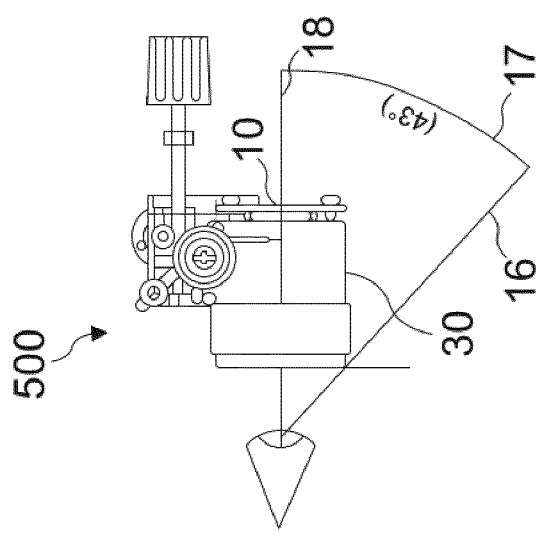
FIG. 5A
FIG. 5B

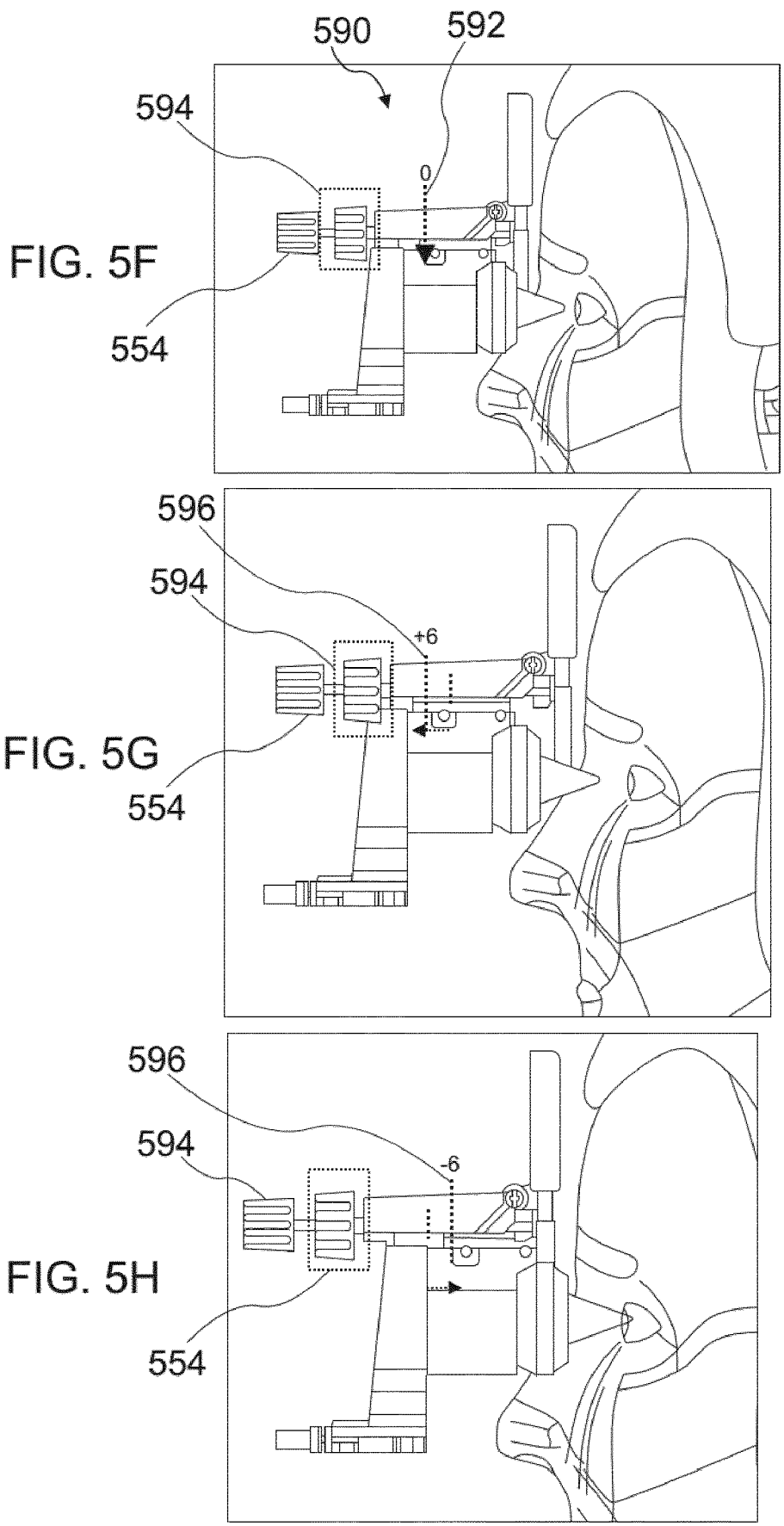

HEAD-MOUNTABLE DISPLAY DEVICE AND METHOD FOR DISPLAYING AN IMAGE RECEIVED FROM A MICROSCOPE

TECHNICAL FIELD

Examples relate to displaying microscope images on head-mountable displays and especially to head-mountable display devices and methods for displaying an image received from a microscope.

BACKGROUND

Microsurgery often demands a distortion-free magnified stereoscopic view of the operating field. Digital stereo microscopes can provide such views of the operating field. The image can be viewed through eye pieces at the microscope or may be displayed on an external screen or by head-mountable displays.

SUMMARY

An embodiment relates to a head-mountable display device for displaying an image received from a microscope. The head-mountable display device comprises a first display configured to display a first image of a part of an object, the first image received from a microscope. Further, the head-mountable display device comprises a first optical arrangement located in front of the first display. The first optical arrangement comprises at least one lens. Additionally, the head-mountable display device comprises a mounting structure configured to fasten the first display to the head of a user. The head-mountable display device is configured to allow a direct line of sight from a first eye of the user to the object in a field of view of the user outside of the first display while the user is watching the first display through the first optical arrangement, if the mounting structure is fastened to the head of a user. An angle between a display direction and the direct line of sight is less than 50° and the display direction is orthogonal to the first display.

By allowing the user a direct line of sight to the object while using the head-mountable display device, it is easier for the user to interact with his direct environment (e.g. with other people or tools) in comparison to display devices, which completely or nearly completely blocking the view of the user.

Another embodiment relates to a head-mountable display device for displaying an image received from a microscope. The head-mountable display device comprises a first display configured to display a first image of a part of an object, the first image received from a microscope. Further, the head-mountable display device comprises a mounting structure configured to fasten the first display to the head of a user. The mounting structure comprises a nose piece configured to align the first display to the first eye of the user. Further, the mounting structure is configured to rest less than 40% of the weight of the head-mountable display device through the nose piece on the nose of the user.

The nose piece may enable a stable alignment of the display to the eye of the user. In this way, misalignments and movement of the display relative to the eye of the user can be significantly reduced or even completely avoided. On the other hand, the mounting structure enables a support of the main portion of the weight of the head-mountable display device on the head of the user but not on the nose. In this way, a high wearing comfort may be enabled.

Another embodiment relates to a head-mountable display device for displaying an image received from a microscope. The head-mountable display device comprises a first display configured to display a first image of a part of an object, the first image received from a microscope. Further, the head-mountable display device comprises a mounting structure configured to fasten the first display to the head of a user. Additionally, the head-mountable display device comprises a first optical arrangement located in front of the first display. The first optical arrangement comprises three lenses. Further, at least one lens of the three lenses is an aspheric lens.

By using at least three lenses between the display and the eye of the user, a good optical performance with respect to magnification and aberrations may be obtainable. By using at least one aspheric lens, the size and weight of the optical arrangement may be significantly reduced in comparison to a system using only spherical lenses. Therefore, a head-mountable display device with small size, low weight and good optical performance may be provided.

SHORT DESCRIPTION OF THE FIGURES

Some examples of apparatuses and/or methods will be described in the following by way of example only, and with reference to the accompanying figures, in which FIG. 1 is a schematic illustration of a head-mountable display device;

FIG. 5a is a side view of another head-mountable display device;

FIG. 5b is a front view of the head-mountable display device of FIG. 5a;

FIG. 5f is a side view of another head-mountable display device;

FIG. 5g is a side view of the head-mountable display device of FIG. 5f;

FIG. 5h is a side view of the head-mountable display device of FIG. 5f;

DETAILED DESCRIPTION

Various examples will now be described more fully with reference to the accompanying drawings in which some examples are illustrated. In the figures, the thicknesses of lines, layers and/or regions may be exaggerated for clarity.

Figure 1:
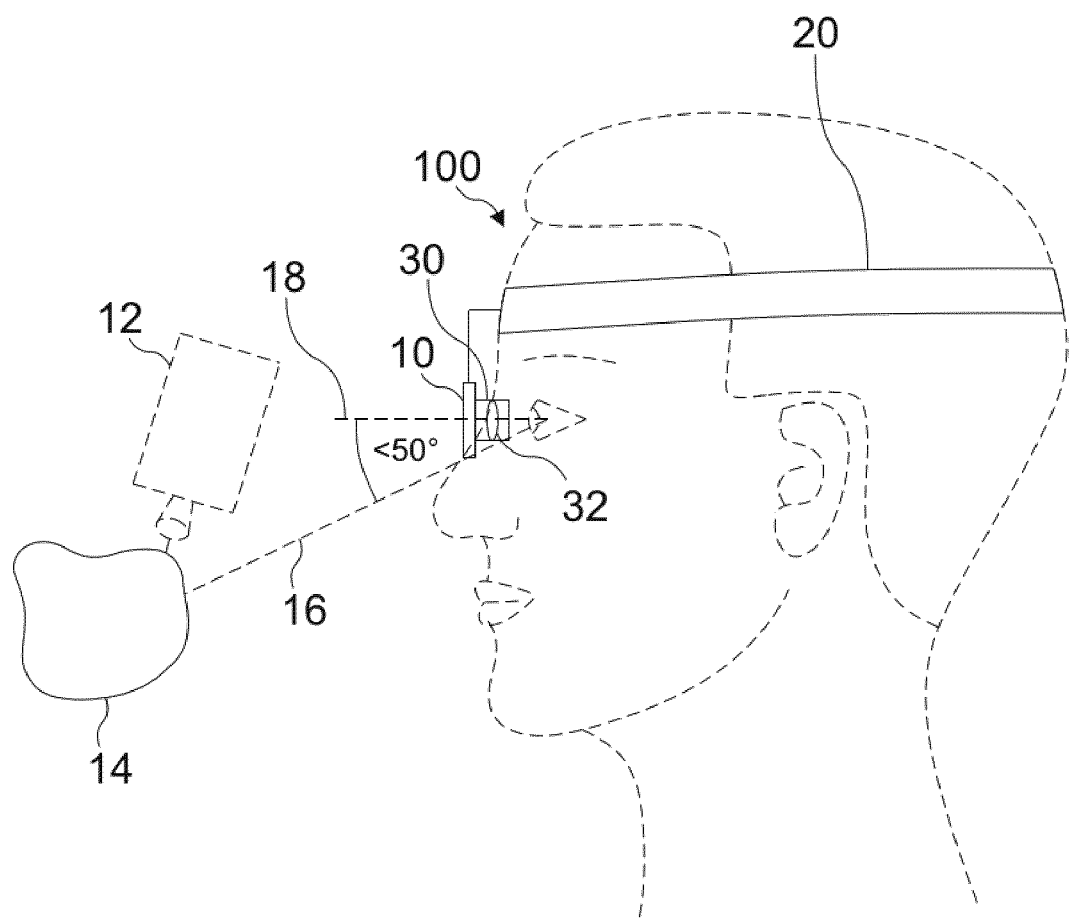

FIG. 1 shows a head-mountable display device for displaying an image received from a microscope according to an embodiment. The head-mountable display device 100 comprises a first display 10 configured to display a first image of a part of an object 14, the first image received from a microscope 12. Further, the head-mountable display device 100 comprises a first optical arrangement 30 located in front of the first display 10. The first optical arrangement 30 comprises at least one lens 32. Additionally, the head-mountable display device 100 comprises a mounting structure 20 configured to fasten the first display 10 to the head of a user. The head-mountable display device 100 is configured to allow a direct line of sight 16 from a first eye of the user to the object 14 in a field of view of the user outside of the first display 10 while the user is watching the first display 10 through the first optical arrangement, if the mounting structure 20 is fastened to the head of a user. A viewing angle between a display direction 18 and the direct line of sight is less than 50° (or less than 45° or less than 40°) and the display direction 18 is orthogonal to the first display 10.

The head-mountable display device 100 may allow the direct line of sight 16 to the object 14 due to the size and/or geometry of the first display 10, the first optical arrangement 30 and/or the position and/or the distance of the first optical arrangement 30 to the eye of the user, for example. By using a first display 10 and/or a first optical arrangement 30 as described below, the size of the display and optical arrangement may be kept low and/or the distance to the eye can be kept large so that a direct line of sight at a viewing angle of less than 50° may be enabled, for example. In this way, the user may have an unblocked view to object at the periphery outside the first display 10 while the user watches the first image on the display. For example, a brain surgeon may have a direct line of sight outside the display to the body or the head of a patient and/or to tools in his hands or close to the head of the patient while watching a magnification of the site of surgery on the display. In this way, the surgeon may have a far better control and/or understanding of on his environment in comparison to a blocked peripheral view.

For example, the direct line of sight 16 may be a straight line between the eye of the user (e.g. the pupil of the eye of the user) and the object 14 without any opaque or intransparent structure in between or without any structure at all in between. The field of view of the user may be unblocked outside the first display 10 and/or the first optical arrangement 30. If the user watches an image on the first display 10 through the first optical arrangement 30, the user may be still able to see his environment at view angles larger than 50° (or larger than 45° or larger than 40°). For example, the viewing angle is measured between the display direction 18 and the direct line of sight 16. The display direction 18 may be orthogonal to a front side of the first display 10. For example, the display direction 18 may be orthogonal to the front side of the first display 10 at a center of the first display 10. The head-mountable display device 100 may be configured to allow the direct line of sight 16 from a first eye of the user to the object 14 in a field of view of the user outside of the first display 10 while the display direction 18 is aligned to the first eye of the user. For example, the head-mountable display device 100 may be configured to allow the direct line of sight 16 over a field of at least 180° (or at least 160° or at least 140°) around the first display 10. The head-mountable display device 100 may be configured to allow the direct line of sight 16 at least below the first display 10.

The mounting structure 20 is configured to fasten, secure, affix and/or mount the first display 10 to the head of a user. The mounting structure 20 may comprise various structural features to enable a secure and stable mounting of the head-mountable display device 100 on the head of a user. For example, the mounting structure 20 may comprise a headband, a head strap, an adjustable frame and/or a head suspension arrangement configured to distribute a weight of the head-mountable display device 10 over the head of the user. The mounting structure 20 may be configured to carry a weight (e.g. the complete weight) of the first display 10. The mounting structure 20 may be configured to rest less than 40% (or less than 50%, less than 30% or less than 20%) of the weight of the head-mountable display device or no weight of the head-mountable display device on the nose of the user (e.g. through a nose piece). By reducing the weight on the nose of the user, the wearing comfort of the head-mountable display device 10 can be significantly increased, while a stability and/or alignment to the eye of the head-mountable display device 10 can still be ensured. For example, the mounting structure 20 may comprises an alignment piece (e.g. a nose piece) which is configured to control an alignment of the head-mountable display device 10 to the user when fastened to the head of the user. By controlling the alignment of the head-mountable display device 10 to the eye of the user, for example by a nose piece, the stability may be improved and/or the misalignment due to movement may be reduced. The mounting structure 20 may be configured to allow an adjustment of a position of the first display 10 to an interpupillary distance of the user. In this way, the alignment of the position of the first display 10 and the first optical arrangement 30 to the eye of the user can be improved.

The first optical arrangement 30 may comprise optical elements (e.g. the at least one lens) in order to magnify the image on the first display 10 for the user. The first optical arrangement 30 may be attached (e.g. glued) to the front surface of the first display 10. For example, the display direction of the first display 10 may be parallel to an optical axis of the first optical arrangement 30. The at least one lens of the first optical arrangement 30 may be an aspheric lens. The aspheric lens may enable to reduce size and weight in comparison to a spherical lens. For example, the first optical arrangement 30 may comprise at least three lenses. Three lenses may enable a good optical performance with respect to magnification and aberrations. For example, the first optical arrangement 30 comprises at least three aspheric lenses. The aspheric lenses may enable to reduce size and weight in comparison to spherical lenses while three lenses may enable a good optical performance with respect to magnification and aberrations. Additionally or alternatively, the first optical arrangement 30 may be configured to allow an adjustment of its diopter. In this way, the user may be able to adapt the device to his individual eye.

For example, the head-mountable display device 100 may be configured to allow a direct line of sight 16 from a first eye of the user to the object 14 in a field of view of the user outside of the first optical arrangement 30 while the user is watching the first display 10 through the first optical arrangement 30, if the mounting structure 20 is fastened to the head of a user. The viewing angle between the optical axis of the first optical arrangement 30 and the direct line of sight may be less than 50° (or less than 45° or less than 40°). For example, the viewing angle of less than 50° may be measured between the optical axis of the first optical arrangement 30 and the direct line of sight 16.

The head-mountable display device 100 may further comprise a second display 40 configured to display a second image of the part of the object. The second image may be received from the microscope. The first image and/or the second image may be part of a live stream of images from the microscope. The second display 40 may be attached to the mounting structure 20 in the same or similar way as the first display 10. The second display 40 may be positioned relative to the first display 10 so that the user can watch the first display 10 with the first eye and the second display 40 with the second eye. The mounting structure 20 may be configured to fasten the second display 40 to the head of the user. The first image and/or the second image may be transmitted to the head-mountable display device 100 over a wired or wireless connection.

The first display 10 and/or second display 40 may be an LCD display (Liquid Crystal Display), a TFT display (Thin-film transistor-Display) or an OLED display (organic light-emitting diode display). A display diagonal of the first display 10 and/or the second display 40 may be at least 0.5 inch (or at least 0.6 inch) and/or at most 1 inch (or at most 0.8 inch).

By using two independent displays, the distance between the displays may be adjustable. For example, the mounting structure 20 may be configured to allow an adjustment of a distance of the first display 10 to the second display 40. In this way, the user may adjust the distance between the two displays to the individual interpupillary distance of the user.

Alternatively to a second display, a first part of the first display 10 is configured to display the first image and a second part of the first display 10 is configured to display the second image of the part of the object. For example, the first display 10 is configured to work in a split screen mode with a first part of the display showing images for a first eye of the user and the second part of the display showing images for the second eye of the user. By using a single display, the number of components of the head-mountable display device 100 may be reduced.

Independent from whether two displays or a single display are used, the first image and the second image may be configured to allow for stereoscopic vision. The user may obtain a three-dimensional impression of the object or a part of the object when watching the first image with the first eye and the second image with the second eye simultaneously.

The object 14 may be a human body, a part of a human body (e.g. the head or chest), a site of surgery or a micro-electronic device (e.g. a semiconductor chip). The user may be a surgeon or any other person in need of a magnified image of an object.

For example, the same object, which is shown on the display, can be seen in the peripheral view. For example, the first image may show a part of a surface of the object and the surface of the object or another part of the surface of the object may be in the field of view of the user outside the display. For example, the first image may show a part of a surface of a human brain during surgery and the surface of the human brain can also be seen by the user in the peripheral view.

The peripherical view might not be limited to the directions outside and below of the headmountable display device 100. It may also be possible to look (e.g. with some limitations) above and to the inner direction (e.g. towards the nose). For example, this may be enabled by arranging the display in coaxial direction of the viewing direction of the eye. Even if the peripherical viewing performance might not be ideal in these additional directions, it may give the user the opportunity to interact with its environment.

The head-mountable display device 100 may also be called digital viewer or digital eyepieces. The head-mountable display device 100 may be a device, which can be carried on the head of a user and has a display for showing images, videos and/or live streams to the user. The head-mountable display device 100 may comprise various additional optional components as, for example, an energy storage device (e.g. one or more power banks) and/or a receiver (e.g. one or more wireless image receivers). For example, the energy storage device may provide a power supply for the first display 10 and/or may be attached to the mounting structure 20 of the head-mountable display device 100 or may be attachable to a part of the user except the head (e.g. through a waist band or an arm band). The receiver may be a wired or wireless receiver. For example, the head-mountable display 100 may be configured to receive the image wirelessly. The receiver may be configured to receive the image to be displayed by the first display 10. The head-mountable display device 100 may be configured so that a weight of at most 600 g (or at most 700 g, at most 500 g or at most 400 g) rest on the head of the user, while using the head-mountable display device 100. The overall weight of the head-mountable display device 100 may be larger, but the remaining weight (e.g. for the energy storage device and/or the receiver) may be carried by other parts of the body of the user (e.g. through a waist band or an arm band).

For example, a latency of the head-mountable display device may be at most 70 ms (or at most 90 ms, at most 60 ms or at most 50 ms). The latency may be the time between receiving an image at the receiver of the head-mountable display device 100 and displaying the image on the first and/or second display. By using fast electrical components for the receiver and/or the display and/or additional image processing components, the head-mountable display device 100 may be able to display live or real-time images or video streams of at least a part of the object 14.

The head-mountable display device 100 may be usable with different kind of microscopes. The head-mountable display device 100 may be connectable to any microscope with a suitable interface. For example, the microscope 12 may be a digital stereo microscope or a digital microscope with only one camera to visualize on object in 2D (e.g. the image from the sole camera may be duplicated and this unique image may be inject in both displays or in only on channel, if only one display is implemented). The microscope is not part of the head-mountable display device 100.

More details and aspects of the head-mountable display device 100 are mentioned in connection with the proposed concept and/or the one or more examples described above or below (e.g. FIGS. 2-11). The head-mountable display device 100 may comprise one or more additional optional features corresponding to one or more aspects of the proposed concept and/or of one or more examples described above or below.

Figure 2:
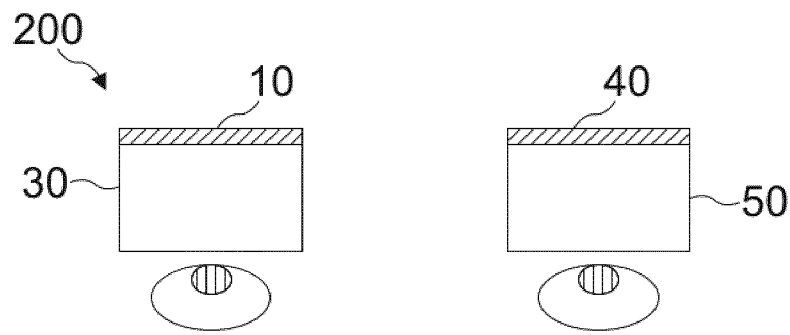
FIG. 2 is a schematic illustration of another head-mountable display device comprising two displays.

FIG. 2 shows a schematic illustration of a head-mountable display device 200 comprising two displays according to an embodiment. The head-mountable display device 200 may be implemented similar to the implementation described in connection with FIG. 1. The first display 10 and the second display 40 may be attached to the mounting structure 20. The second display 40 may be positioned relative to the first display 10 so that the user can watch the first display 10 with the first eye and the second display 40 with the second eye. A first optical arrangement 30 is mounted to the front side of the first display 10 and a second optical arrangement 50 is mounted to the front side of the second display 40. The first optical arrangement 30 and the second optical arrangement 50 may comprise one or more optical elements (e.g. lenses). The second optical arrangement 50 may be implemented similar or equal to the first optical arrangement 30 with respect to the number and type of lenses.

More details and aspects of the head-mountable display device 200 are mentioned in connection with the proposed concept and/or the one or more examples described above or below (e.g. FIG. 1 or 3-11). The head-mountable display device 200 may comprise one or more additional optional features corresponding to one or more aspects of the proposed concept and/or of one or more examples described above or below.

Figure 3:
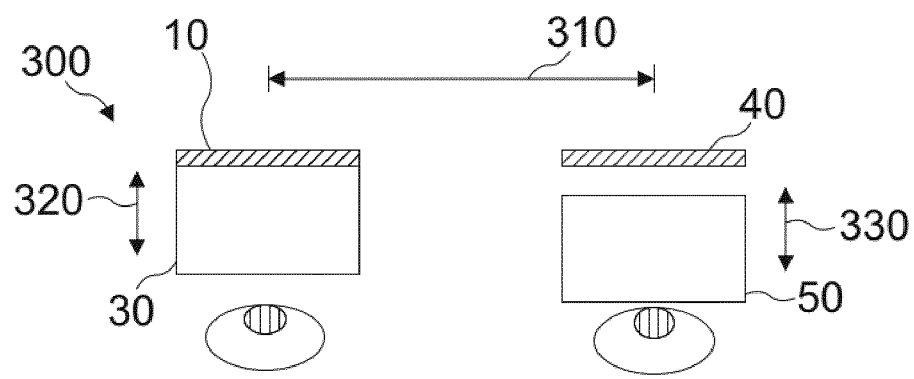
FIG. 3 is a schematic illustration of another head-mountable display device allowing an adjustment of the interpupillary distance.

FIG. 3 shows a head-mountable display device 300 allowing an adjustment of the interpupillary distance according to an embodiment. The head-mountable display device 300 may be implemented similar to the implementation described in connection with FIG. 2. In addition, the mounting structure 20 is configured to allow an adjustment of a distance of the first display 10 to the second display 40. In this way, the user may adjust the distance between the two displays to the individual interpupillary distance. Further, the first optical arrangement 30 may be configured to allow an adjustment of its diopter. For example, a distance between one or more optical elements (e.g. lenses) to the display may be adjustable. In this way, the user may be able to adapt the device to his individual eye.

More details and aspects of the head-mountable display device 300 are mentioned in connection with the proposed concept and/or the one or more examples described above or below (e.g. FIG. 1-2 or 4a-11). The head-mountable display device 300 may comprise one or more additional optional features corresponding to one or more aspects of the proposed concept and/or of one or more examples described above or below.

Figures 4A, 4B:
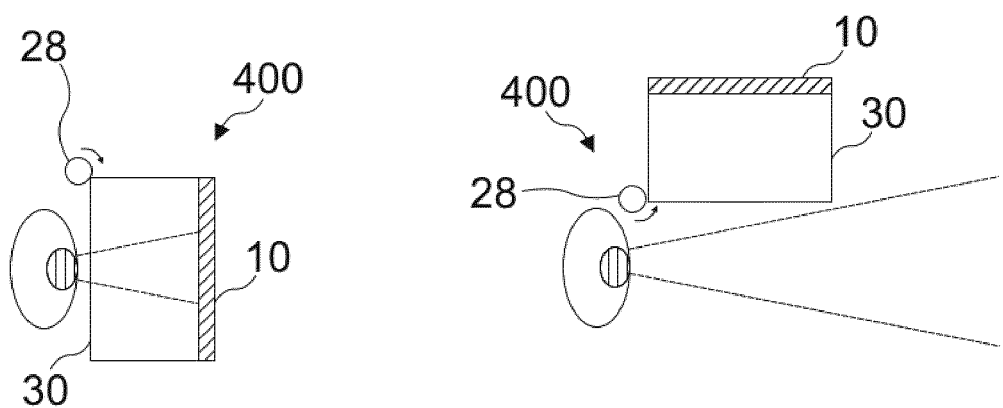
FIG. 4a is a schematic illustration of another head-mountable display device in a first state.
FIG. 4b is a schematic illustration of the head-mountable display device of FIG. 4a in a second state.

FIGS. 4a and 4b shows a head-mountable display device 400 according to an embodiment. The head-mountable display device 400 may be implemented similar to the implementation described in connection with FIG. 1, 2 or 3. In addition the head-mountable display device 400 is configured to allow at least partial removal of the first display 10 from the field of view of the user. For example, the first display 10 may be manually or automatically rotatable or slidable at least partly out of the view of the user. For example, the mounting structure 20 may be configured to remove the first display 10 automatically in response to an identified event (e.g. receive a control signal caused by the user or by automatic detection of an event). FIG. 4a shows the head-mountable display device 400 in a first state (e.g. normal use stage). In the first state, the display direction of the first display 10 and/or the optical axis of the first optical arrangement 30 may be aligned to the eye of the user. For example, the optical axis of the first optical arrangement 30 passes through the pupil of the eye of the user in the first state. FIG. 4b shows the head-mountable display device 400 in a second state (e.g. removed state). In the second state, the user may have a direct and/or unblocked line of sight to the object in the center of the field of view of the user. In the second state, the first display 10 and the first optical arrangement 30 are located at a position so that the display direction of the first display 10 and/or the optical axis of the first optical arrangement 30 is not aligned to the eye of the user. In the second state, the optical axis of the first optical arrangement 30 does not extend to the eye of the user, for example. The mounting structure 20 may comprise a hinge 28 configured to at least partially remove the first display 10 from the field of view of the user as shown in FIGS. 4a and 4b. The first display 10 may be mechanically connected to the hinge 28. Alternatively or additionally, the mounting structure 20 may comprise a sliding mechanism configured to at least partially remove the first display 10 from the field of view of the user. The first display 10 may be mechanically connected to the sliding mechanism.

FIGS. 4a and 4b may show an example of a viewer (head-mountable display device), which may contain a mechanism for moving the optics out of the users view. This movement may be realized automated and/or manually and may enable a change from digital view to direct view.

More details and aspects of the head-mountable display device 400 are mentioned in connection with the proposed concept and/or the one or more examples described above or below (e.g. FIG. 1-3 or 5a-11). The head-mountable display device 400 may comprise one or more additional optional features corresponding to one or more aspects of the proposed concept and/or of one or more examples described above or below.

FIGS. 5a and 5b show a head-mountable display device 500 according to an embodiment. The head-mountable display device 500 may be implemented similar to the implementation described in connection with FIG. 1. The head-mountable display device 500 enables a direct line of sight from a first eye of the user to the object in a field of view of the user outside of the first display 10 and the first optical arrangement 30 while the user is watching the first display 10 through the first optical arrangement 30 while the mounting structure 20 is fastened to the head of a user. The viewing angle 17 between the display direction 18 and the direct line of sight 16 is at least 43°. Further, the head-mountable display device 500 is configured to allow the direct line of sight 16 over a field of at least 180° around the first display 10.

More details and aspects of the head-mountable display device 500 are mentioned in connection with the proposed concept and/or the one or more examples described above or below (e.g. FIGS. 1-4b or 5c-11). The head-mountable display device 500 may comprise one or more additional optional features corresponding to one or more aspects of the proposed concept and/or of one or more examples described above or below.

Figure 5C:
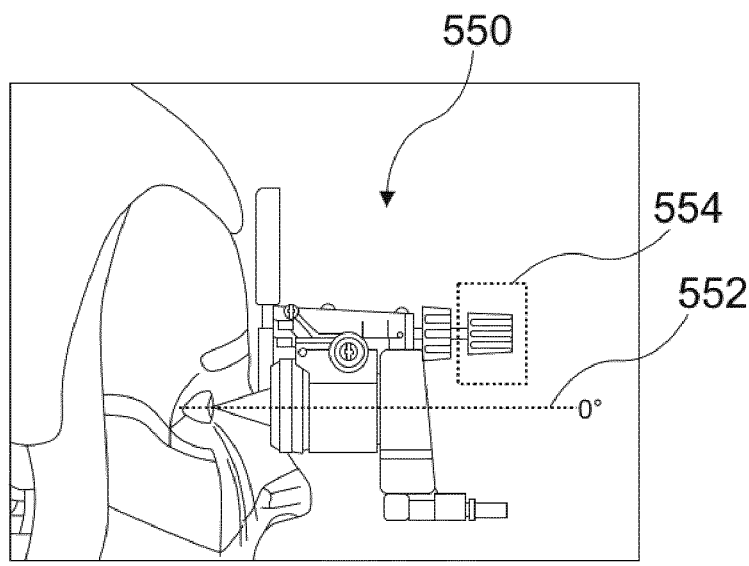
FIG. 5c is a side view of another head-mountable display device.
Figure 5D:
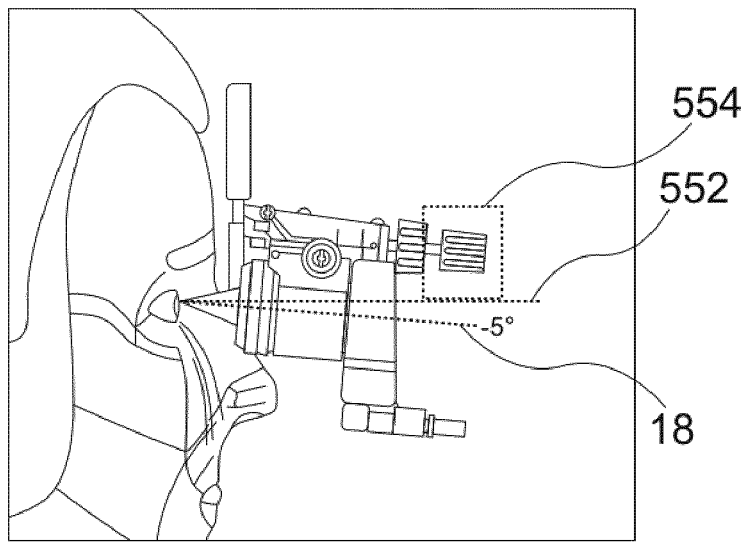
FIG. 5d is a side view of the head-mountable display device of FIG. 5c.
Figure 5E:
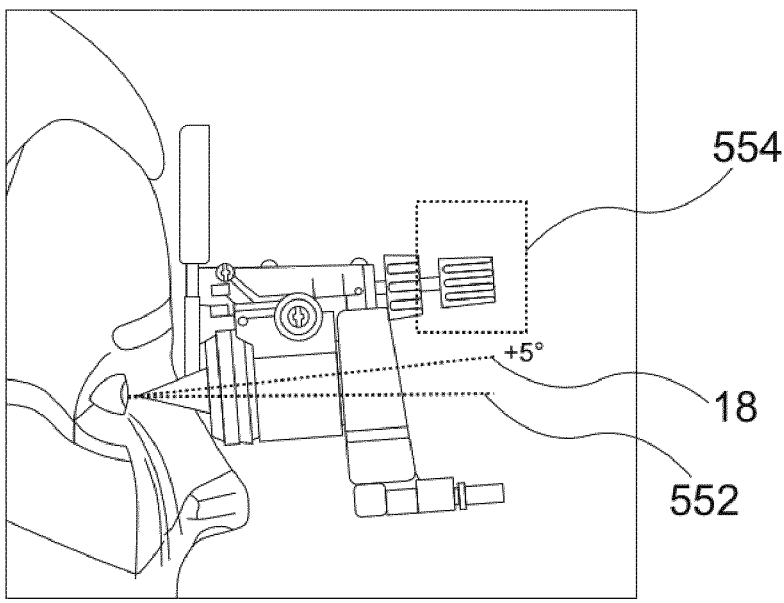
FIG. 5e is a side view of the head-mountable display device of FIG. 5c.

FIG. 5c shows a side view of a head-mountable display device 550 according to an embodiment. The head-mountable display device 550 may be implemented similar to the implementation described in connection with FIG. 1. The head-mountable display device 550 is configured to be tilted relative to a reference plane 552 of the head-mountable display device 550. In FIG. 5c, the display direction 18 of the display and/or the optical axis of the optical arrangement is in parallel with the reference plane 552. In FIG. 5d, the display direction 18 of the display and/or the optical axis of the optical arrangement is tilted by −5° below the reference plane 552. In FIG. 5e the display direction 18 of the display and/or the optical axis of the optical arrangement is tilted by +5° above the reference plane 552. For example, the head-mountable display device 550 may be configured to be tilted relative to a reference plane 552 of the head-mountable display device 550 at least by +/−10° and/or at most by +/−20°. The head-mountable display device 550 may comprise a tilt adjuster 554 for manual adjustment of the tilt arranged on a side of the display opposite to the side of the optical arrangement and between the eyes of the user.

More details and aspects of the head-mountable display device 550 are mentioned in connection with the proposed concept and/or the one or more examples described above or below (e.g. FIGS. 1-5b or 5f-11). The head-mountable display device 550 may comprise one or more additional optional features corresponding to one or more aspects of the proposed concept and/or of one or more examples described above or below.

FIG. 5f shows a side view of a head-mountable display device 590 according to an embodiment. The head-mountable display device 590 may be implemented similar to the implementation described in connection with FIG. 1. The head-mountable display device 590 is configured to allow an adjustment of the distance between the optical arrangement and the eye of the user. In FIG. 5f, a distance offset with respect to a reference distance 592 between the optical arrangement and the eye of the user is zero. In FIG. 5g, a distance offset 596 with respect to the reference distance 592 between the optical arrangement and the eye of the user is +6 mm. In FIG. 5h, a distance offset 596 with respect to the reference distance 592 between the optical arrangement and the eye of the user is −6 mm. For example, the head-mountable display device 590 may be configured to allow an adjustment of the offset distance 596 at least by +/−10 mm and/or at most +/−15 mm with respect to the reference distance 592. The head-mountable display device 590 may comprise a distance adjuster 594 for manual adjustment of the distance. The distance adjuster 594 may be arranged on a side of the display opposite to the side of the optical arrangement and between the eyes of the user.

The head-mountable display device 590 may comprise additionally a tilt adjuster 554 for manual adjustment of the tilt as described in connection with FIGS. 5c-5e. For example, the tilt adjuster 554 and the distance adjuster 594 may be rotatable around a mutual axis, but may enable an adjustment of tilt and distance independently. The distance adjuster 594 may be arranged between the tilt adjuster 554 and the display.

More details and aspects of the head-mountable display device 590 are mentioned in connection with the proposed concept and/or the one or more examples described above or below (e.g. FIGS. 1-5e or 6-11). The head-mountable display device 590 may comprise one or more additional optional features corresponding to one or more aspects of the proposed concept and/or of one or more examples described above or below.

Figure 6:
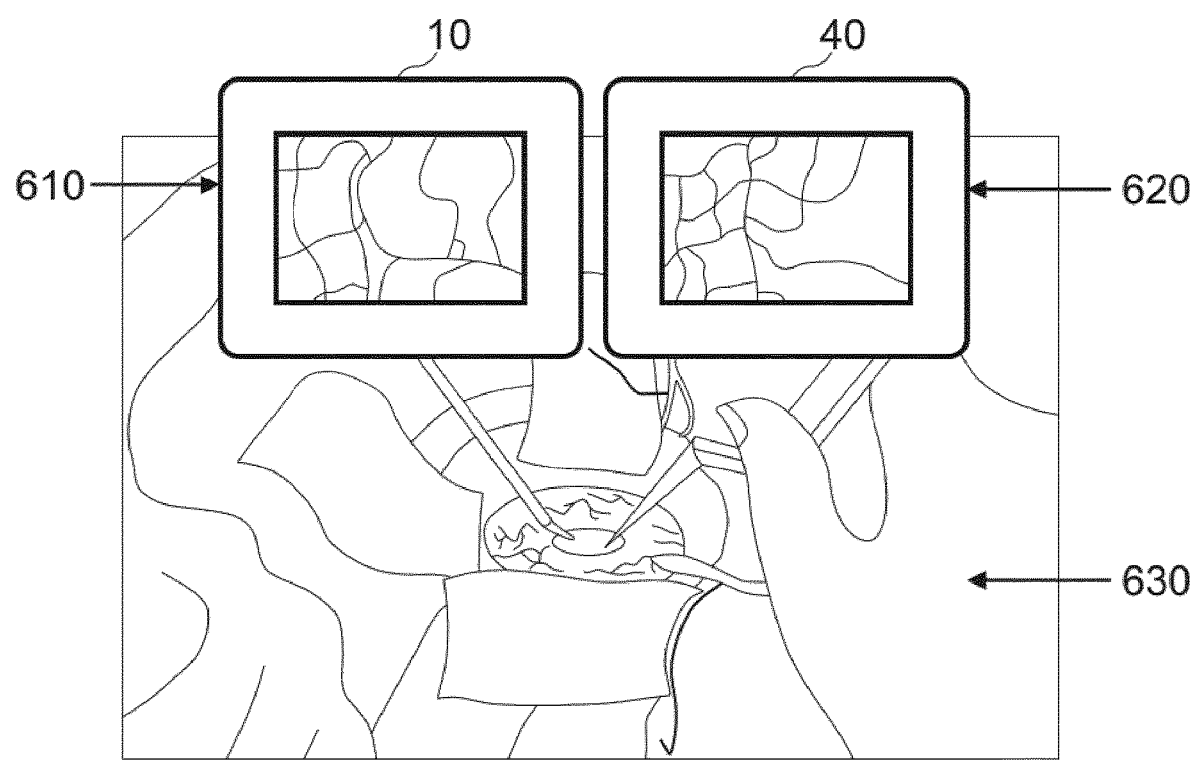
FIG. 6 is an illustration of a user view.

FIG. 6 is an example of a possible user view for one of the head-mountable display devices described above or below. FIG. 6 shows an example of a left channel image 610 on the first display 10, a right channel image 620 on the second display 40 and the unblocked peripheral view 630 of a site of surgery of a human brain.

Figure 7:
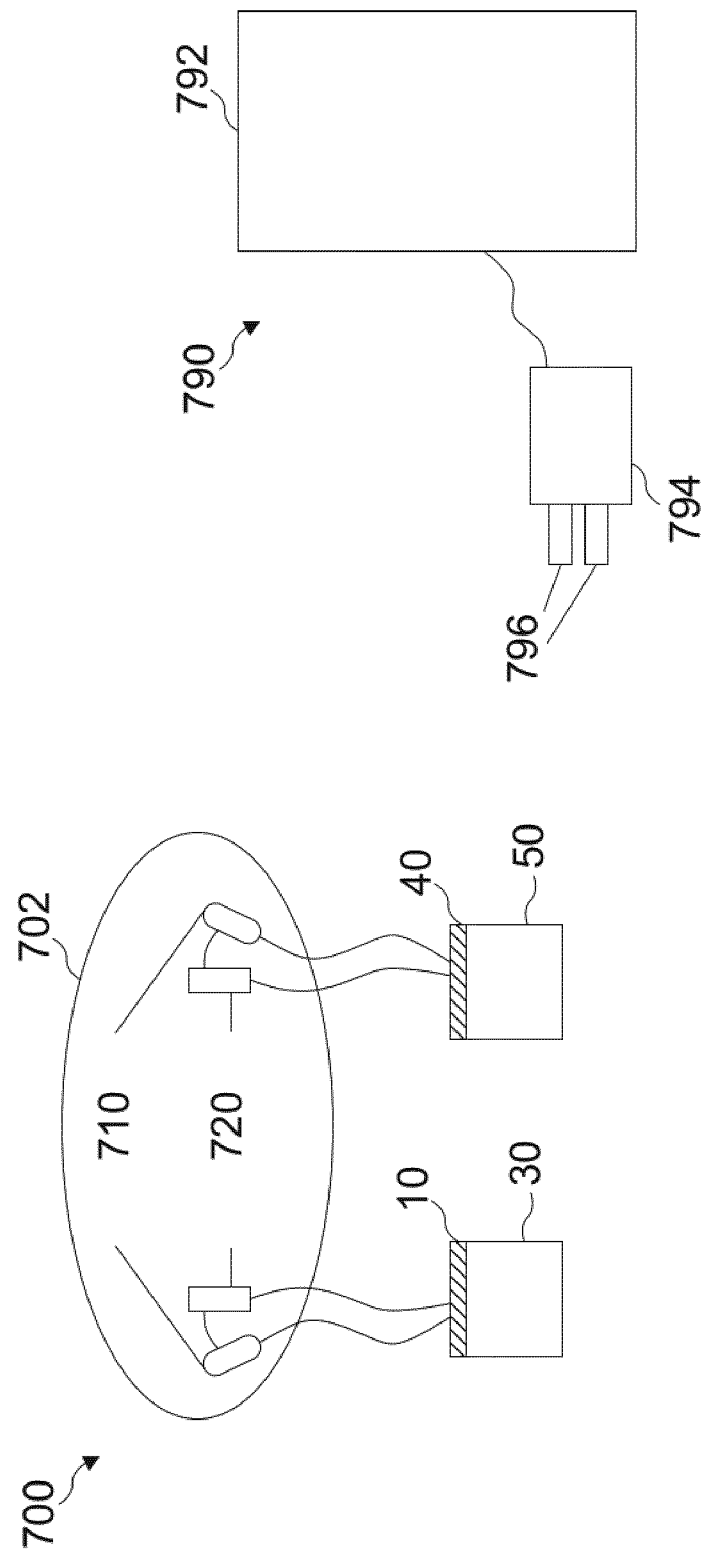
FIG. 7 is a schematic illustration of another head-mountable display device and a microscope system.

FIG. 7 shows a head-mountable display device 700 according to an embodiment and a microscope system 790. The head-mountable display device 700 may be implemented similar to the implementation described in connection with FIG. 1, 2, 3, 4a, 4b, 5a and/or 5b. The headmountable display device 700 comprises a power bank 710 and a wireless image receiver 720 for the first display 10 and a power bank 710 and a wireless image receiver 720 for the second display 40. Alternatively, the first display 10 and the second display 40 may be supplied with power by a common power bank 710 and/or may be provided by images received by a common wireless image receiver 720. The microscope system 790 may comprise a digital microscope 792 comprising one or more cameras controlled by one or more camera controllers 794 comprising one or more wireless image transmitters 796.

More details and aspects of the head-mountable display device 700 are mentioned in connection with the proposed concept and/or the one or more examples described above or below (e.g. FIG. 1-6 or 8-11). The head-mountable display device 700 may comprise one or more additional optional features corresponding to one or more aspects of the proposed concept and/or of one or more examples described above or below.

Figure 8:
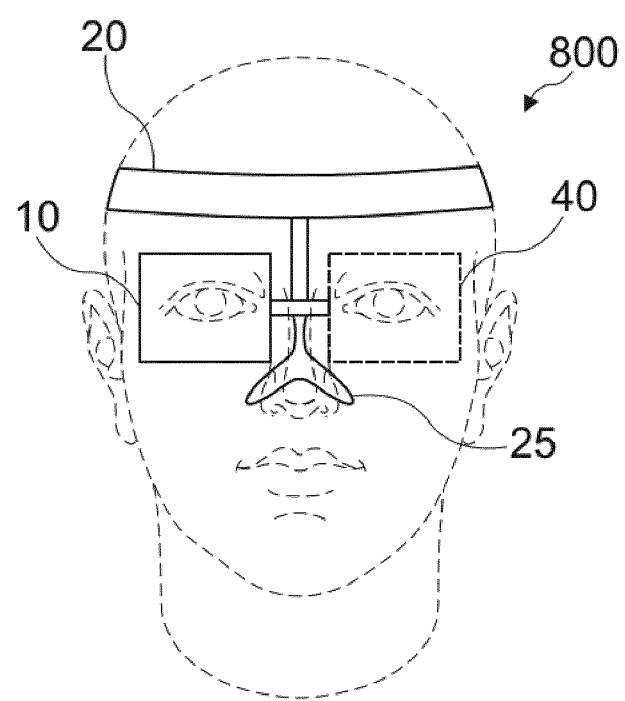
FIG. 8 is a schematic illustration of a head-mountable display device with a nose piece.

FIG. 8 shows a head-mountable display device for displaying an image received from a microscope according to an embodiment. The head-mountable display device 800 comprises a first display 10 configured to display a first image of a part of an object, the first image received from a microscope. Further, the head-mountable display device 800 comprises a mounting structure 20 configured to fasten the first display 10 to the head of a user. The mounting structure 20 comprises a nose piece 25 configured to align the first display 10 to the first eye of the user. Further, the mounting structure 20 is configured to rest less than 40% (or less than 50%, less than 30% or less than 20%) of the weight of the head-mountable display device through the nose piece 25 on the nose of the user.

The nose piece 25 may be configured (e.g. may comprise a geometry) to contact the nose of a user at least at one point on a left side of the nose and at least at one point on the right side of the nose, if the mounting structure 20 is fastened to the head of a user. In this way, a movement of the head-mountable display device 800 to the right or left relative to the nose may be significantly reduced or avoided, if the user moves his head.

For example, the head-mountable display device 800 is configured so that a weight of at most 250 g (or at most 200 g, at most 150 g or at most 100 g) rest on the nose of the user, while using the head-mountable display device 800.

For example, at least 10% (or at least 20% or at least 30%) of the weight of the head-mountable display device may rest on the nose of the user through the nose piece 25, while the user is using the head-mountable display device. In this way, a stable alignment may be ensured.

More details and aspects of the head-mountable display device 800 are mentioned in connection with the proposed concept and/or the one or more examples described above or below (e.g. FIG. 1-7 or 9-11). The head-mountable display device 800 may comprise one or more additional optional features corresponding to one or more aspects of the proposed concept and/or of one or more examples described above or below.

Figure 9:
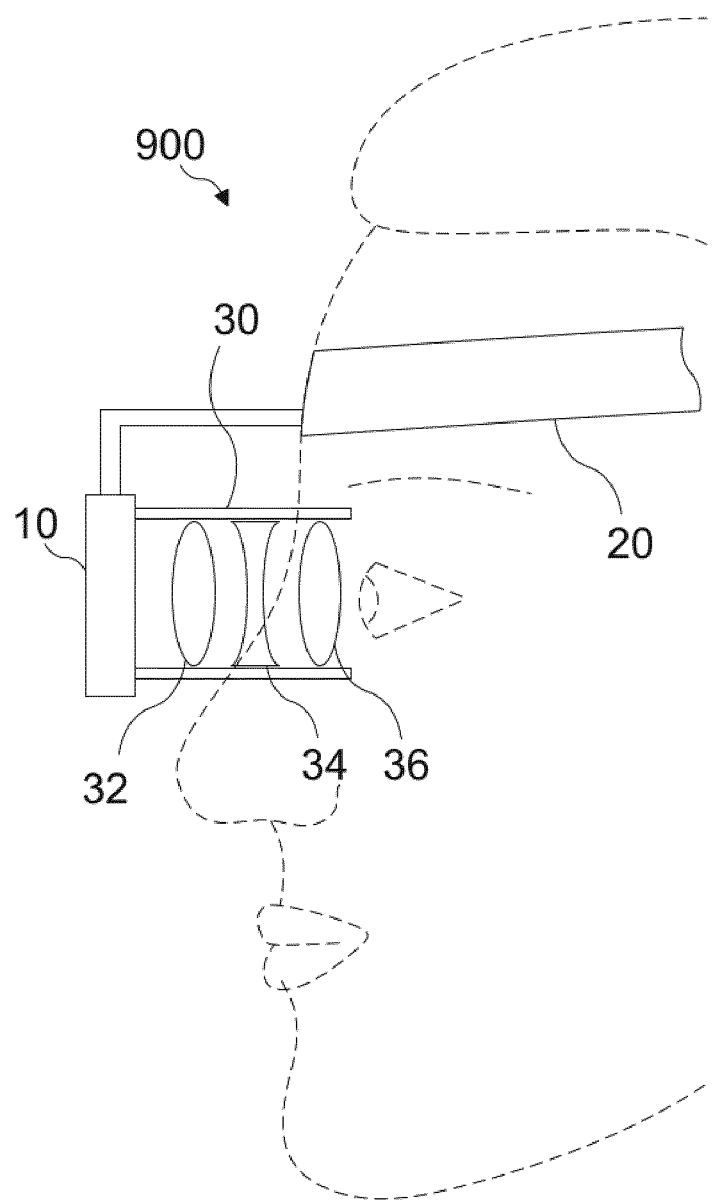
FIG. 9 is a schematic illustration of a head-mountable display device with an optical arrangement comprising at least three lenses.

FIG. 9 shows a head-mountable display device for displaying an image received from a microscope. The head-mountable display device 900 comprises a first display 10 configured to display a first image of a part of an object, the first image received from a microscope. Further, the head-mountable display device 900 comprises a mounting structure 20 configured to fasten the first display to the head of a user. Additionally, the head-mountable display device 900 comprises a first optical arrangement 30 located in front of the first display 10. The first optical arrangement 30 comprises three lenses 32, 34, 36. Further, at least one lens of the three lenses 32, 34, 36 is an aspheric lens.

By using at least three lenses between the display and the eye of the user, a good optical performance with respect to magnification and aberrations may be obtainable. By using at least one aspheric lens, the size and weight of the optical arrangement may be significantly reduced in comparison to a system using only spherical lenses.

For example, the first optical arrangement 30 comprises a first lens 32, a second lens 34 and a third lens 36. The first lens 32 may be the lens of the three lenses closest to the first display 10. The second lens 34 may be arranged between the first lens 32 and the third lens 36. The first optical arrangement 30 may comprise exactly three lenses or may comprise more than three lenses. The three lenses may be glass lenses or may be made of other suitable material.

The aspheric lens of the three lenses may be the first, second or third lens. For example, the aspheric lens may be the second lens 34 while the first lens 32 and the third lens may be spherical lenses. Alternatively, all three lenses may be aspheric lenses. In this way, size and weight of the first optical arrangement 30 may be kept low.

For example, each lens of the three lenses may comprise a first surface and a second surface. The surfaces of the three lenses may represent or form a sequence of surfaces. For example, the first surface of the first aspheric lens may be a first spherical surface, the second surface of the first aspheric lens may be a first aspherical surface, the first surface of the second aspheric lens may be a second spherical surface, the second surface of the second aspheric lens may be a second aspherical surface, the first surface of the third aspheric lens may be a third spherical surface and the second surface of the third aspheric lens may be a third aspherical surface. The sequence of surfaces may comprise a first spherical surface followed by a first aspherical surface followed by a second spherical surface followed by a second aspherical surface followed by a third spherical surface followed by a third aspherical surface. For example, the sequence of surfaces does not contain a diffractive surface. An optical path through the optical arrangement 30 might not contain a diffractive surface at all.

For example, each lens of the three lenses comprises a different glass material. Three different glass materials may be used for the three lenses. For example, the first lens may comprise or consist of a first glass material, the second lens may comprise or consist of a second glass material and the third lens may comprise or consist of a third glass material. For example, the first glass material, the second glass material and the third glass material are three different glass materials.

For example, the first lens 32 may be a positive lens and/or an aspheric lens. A focal length of the first lens 32 may be at most 25 mm (or at most 20 mm or at most 30 mm) and/or at least 15 mm (or at least 10 mm or at least 20 mm).

For example, the second lens 34 may be a negative lens and/or an aspheric lens. A focal length of the second lens 34 may be at most −15 mm (or at most −20 mm or at most −13 mm) and/or at least −5 mm (or at least −10 mm or at least −3 mm).

For example, the third lens 36 may be a positive lens and/or an aspheric lens. A focal length of the third lens 36 may be at most 20 mm (or at most 25 mm or at most 17 mm) and/or at least 10 mm (or at least 13 mm or at least 7 mm).

By using one or more of the above parameters, a desired viewing angle, overall size, weight and/or exit pupil size may be obtained.

For example, one or more of the three aspheric lenses may be free form lenses. In this way, the size and weight may be further reduced, but the costs may be increased.

A total weight of the three lenses (e.g. first lens 32, second lens 34 and third lens 36) may be at most 30 g (or at most 25 g, at most 20 g or at most 35 g). A diameter of each lens of the three lenses (e.g. first lens 32, second lens 34 and third lens 36) may be at most 25 mm (or at most 20 mm or at most 30 mm). A total focal length of the first optical arrangement 30 may be at most 30 mm (or at most 35 mm or at most 25 mm) and/or at least 15 mm (or at least 10 mm or at least 20 mm). A total optimal distance between the first display 10 and an eye of a user caused by the first optical arrangement 30 may be at most 60 mm (or at most 70 mm, at most 55 mm or at most 50 mm). By implementing the first optical arrangement 30 with one or more of the mentioned parameters, size and/or weight of the first optical arrangement 30 and the head-mountable display device 900 may be kept low.

A display diagonal of the first display 10 may be at least 0.5 inch (or at least 0.6 inch) and/or at most 1 inch (or at most 0.8 inch). In this way, a sufficiently large image can be displayed while the weight may be kept low.

The head-mountable display device 900 may comprise a second display and a second optical arrangement as described in connection with some other examples.

More details and aspects of the head-mountable display device 900 are mentioned in connection with the proposed concept and/or the one or more examples described above or below (e.g. FIG. 1-8 or 10-11). The head-mountable display device 900 may comprise one or more additional optional features corresponding to one or more aspects of the proposed concept and/or of one or more examples described above or below.

Figure 10:
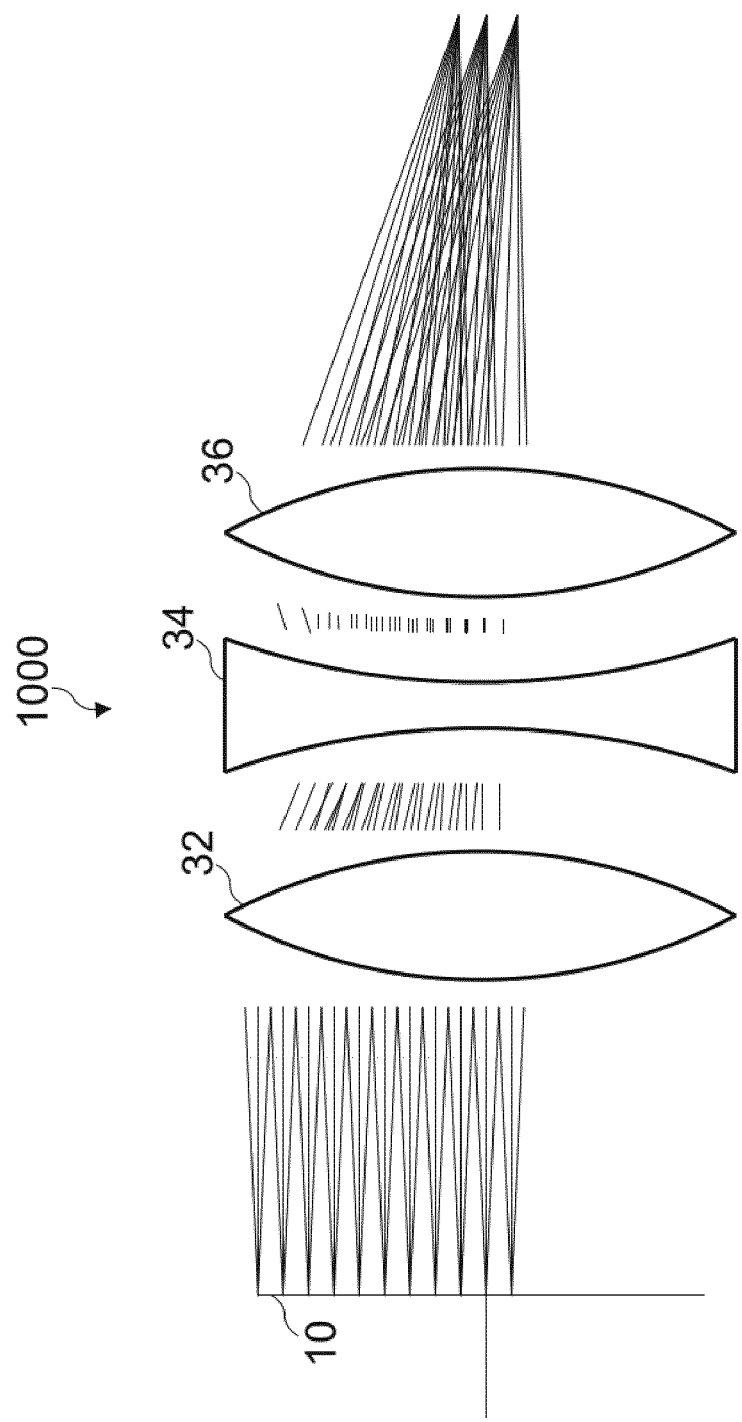
FIG. 10 is a schematic illustration of an optical arrangement for a head-mountable display device.

FIG. 10 shows an optical arrangement 1000 for a head-mountable display device according to an embodiment. The optical arrangement 1000 may be implemented similar to the implementation of the first optical arrangement described in connection with FIG. 1 and/or 9. The optical arrangement 1000 comprises three aspheric lenses. The first lens 32 is a positive lens, the second lens 34 is a negative lens and the third lens 36 is a positive lens. A total focal length of the optical arrangement 1000 is at most 30 mm and at least 15 mm. A focal length of the first lens 32 is at most 25 mm and at least 15 mm, a focal length of the second lens 34 is at most −15 mm and at least −5 mm and a focal length of the third lens 36 is at most 20 mm and at least 10 mm. A total weight of the three lenses 32, 34, 36 is at most 30 g. A diameter of each lens of the three lenses 32, 34, 36 is at most 25 mm. A total optimal distance between the first display 10 and an eye of a user caused by the optical arrangement 1000 is at most 60 mm.

The optical arrangement 1000 shown in FIG. 10 may be used as first optical arrangement and/or second optical arrangement of one of the head-mountable display devices described above or below.

More details and aspects of the optical arrangement 1000 are mentioned in connection with the proposed concept and/or the one or more examples described above or below (e.g. FIG. 1-9 or 11). The optical arrangement 1000 may comprise one or more additional optional features corresponding to one or more aspects of the proposed concept and/or of one or more examples described above or below.

Figure 11:
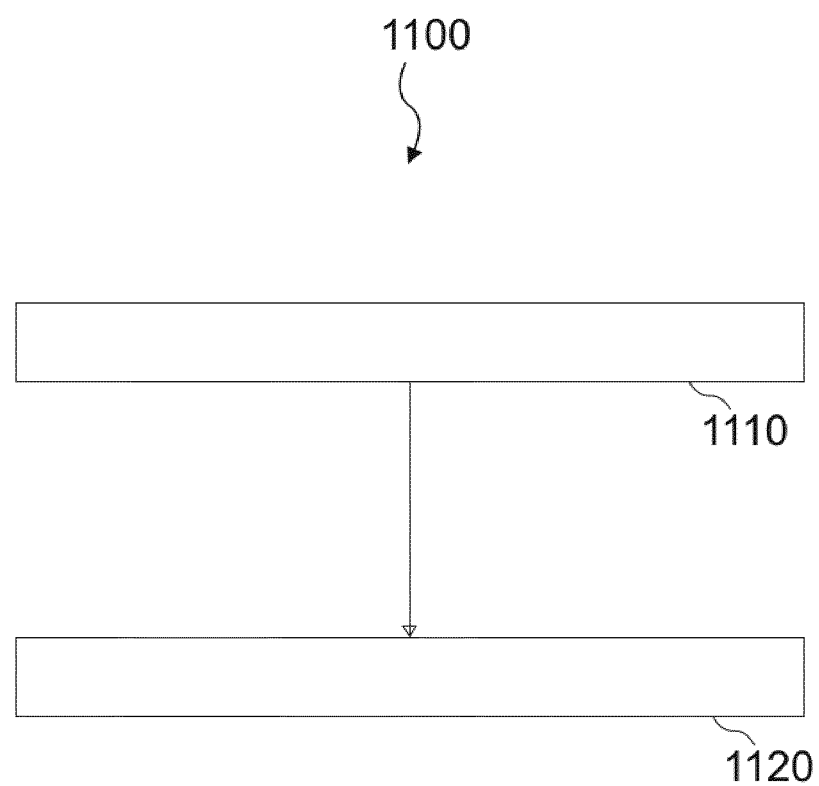
FIG. 11 is a flowchart of a method for displaying an image received from a microscope.

FIG. 11 shows a flowchart of a method for displaying an image received from a microscope according to an embodiment. The method 1100 comprises receiving 1110 a first image of a part of an object from a microscope and displaying 1120 the first image on a first display of a head-mountable display device fastened to a head of the user by a mounting structure of the head-mountable display device. The head-mountable display device is configured to allow a direct line of sight from a first eye of the user to the object in a field of view of the user outside of the first display while the user is watching the first display through a first optical arrangement, if the head-mountable display device is fastened to the head of a user by a mounting structure. Further, an angle between a display direction and the direct line of sight is less than 50°. Additionally, the display direction is orthogonal to the first display and the first optical arrangement located in front of the first display and comprises at least one lens.

More details and aspects of the method 1100 are mentioned in connection with the proposed concept and/or the one or more examples described above or below (e.g. FIGS. 1-10). The method 1100 may comprise one or more additional optional features corresponding to one or more aspects of the proposed concept and/or of one or more examples described above or below.

Some embodiments relate to a head-mounted device to digitally visualize, in live, images from a digital microscope and/or a head-mounted digital viewer or digital eyepieces according to one of the examples described above. In comparison to systems, which completely enclose the user and block the peripheral view of the user by the goggles, the proposed system enables an unblocked peripheral view, for example. Further, in comparison to systems with heavy digital viewers, the proposed system may provide an improved stability so that the alignment of each eye in front of each channel can be kept. The digital viewer may comprise two separate channels, one per eye. Each channel may comprise one or several optical element(s) and a display (e.g. see FIG. 2).

The optics may be used to magnify the view of the display and may allow stereo view of the images transmitted by the digital microscope. The optics may be designed to be light weight (e.g. to avoid head/muscle pain since the device is worn on the head), may be compact and may allow unblocked peripheral view for the user (e.g. to allow the surgeon, for example, to see tools, hands and assistants if necessary) as shown in FIG. 6, for example.

The mechanics may be designed to be light weight, compact and ergonomic to allow unblocked peripheral view. The cables for image transmission and power supply may be handled by the mechanics. The digital viewer may be powered and may receive the images in a wireless way. For example, the digital viewer may use power banks and image transmission dongles.

The digital viewer may be mounted on the head or the body of the user and may be positioned by a resting part which sits on the nose to align the two optical channels to the eyes, for example. The digital viewer geometry may be based on the middle part of most glasses and provides together with the head strap the necessary stability of the display module to the individual eye. This resting concept (e.g. orientation controlled on the nose and fixation with straps on the head) may overcome the disadvantages of pure goggle or pure head mounted solutions.

The whole viewer may be held in place by a strap or an adjustable frame around the head. The mechanics may be designed to fit individual head geometries by one or several adjustment options and may contain a mechanism for moving the optics out of the users view.

A proposed head-mountable display device may enable an adaptation of the two digital channels individually for diopter mismatch and interpupillary distance, a live simultaneous microscopic view and peripherical view, a change from digital view to direct view, a positioning of the digital viewer with the combination of rest pads on nose and stripe on head, and/or a wireless connection and mobile power support.

For example, to get a stereoscopic impression with a visual microscope both visual channels have to be adjusted in that way, that the exit pupil of the individual eyepiece meets the pupil of the human eye. This may be realized with the opportunity of interpapillary distance (IPD) adjustment. In comparison to a pure visual microscope, the optical system of the digital viewer may provide an image outside its designed exit pupil. The best location for the human eye may be the central axis of the individual eye piece. If both eyes are not located at the ideal lateral position—even if the IPD is adjusted correctly—the optical performance of the system may suffer. This can result in different aberrations in the image up to the missing ability to generate the stereoscopic impression. The design of the proposed optical system may prevent this risk with the respective effort (e.g. number and shape of lenses).

The optical design with 3 aspherical lenses may be chosen to optimize size and weight of the optical module. For example, element(s) may be used that bring the display content to infinite to have relaxed view of it at a desired magnification and in a compact way with diopter adjustment and the possibility to use glasses. For example, 3 lenses causing a total length (display to eye) of less than 60 mm may be used.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

LIST OF REFERENCE SIGNS 10 first display
12 microscope
14 object
16 direct line of sight
17 viewing angle
18 display direction
20 mounting structure
25 nose piece
28 hinge
30 first optical arrangement
32 first lens
34 second lens
36 third lens
40 second display
50 second optical arrangement
100 head-mountable display device
200 head-mountable display device
300 head-mountable display device
310 interpupillary distance adjustment
320 diopter adjustment
400 head-mountable display device
500 head-mountable display device
550 head-mountable display device
552 reference plane
554 tilt adjuster
590 head-mountable display device
592 reference distance
594 distance adjuster
596 distance offset
610 left channel
620 right channel
630 unblocked peripheral view
700 head-mountable display device
702 supply unit
710 energy storage device
720 wireless image receiver
790 microscope system
792 digital microscope
794 camera controller 796 wireless image transmitter
800 head-mountable display device
900 head-mountable display device
1000 optical arrangement
1100 method for displaying an image received from a microscope
1110 receiving a first image
1120 displaying the first image

The invention claimed is:

1. Head-mountable display device for displaying an image received from a microscope, comprising:
- a first display configured to display a first image of a part of an object, the first image received from a microscope;
- a first optical arrangement located in front of the first display, wherein the first optical arrangement comprises at least one lens; and
- a mounting structure configured to fasten the first display to the head of a user,
- wherein the head-mountable display device is configured to allow a direct line of sight from a first eye of the user to the object in a field of view of the user outside of the first display while the user is watching the first display through the first optical arrangement, if the mounting structure is fastened to the head of a user, wherein an angle between a display direction and the direct line of sight is less than 50°, wherein the display direction is orthogonal to the first display, wherein the head-mountable display device is configured to allow the direct line of sight over a field of at least 180° around the first display,
- wherein the first optical arrangement comprises at least three lenses and each lens of the at least three lenses comprise different glass material.

2. Head-mountable display device according to claim 1, wherein the first optical arrangement comprises at least three aspheric lenses.

3. Head-mountable display device according to claim 1, wherein the first optical arrangement is configured to allow an adjustment of its diopter.

4. Head-mountable display device according claim 1, wherein the head-mountable display is configured to receive the image wirelessly.

5. Head-mountable display device according to claim 1, further comprising
- a second display configured to display a second image of the part of the object, the second image received from the microscope,
- wherein the mounting structure is further configured to fasten the second display to the head of the user.

6. Head-mountable display device according to claim 5, wherein the mounting structure is further configured to allow an adjustment of a distance of the first display to the second display.

7. Head-mountable display device according to claim 1, wherein a first part of the first display is configured to display the first image and a second part of the first display is configured to display a second image of the part of the object, the second image received from the microscope.

8. Head-mountable display device according to claim 5, wherein the first image and the second image are configured to allow for stereoscopic vision.

9. Head-mountable display device according claim 1, wherein the mounting structure comprises an alignment piece which is configured to control an alignment of the head-mountable display device to the user when fastened to the head of the user.

10. Head-mountable display device according to claim 9, wherein the alignment piece is a nose piece configured to align the first display to the first eye of the user.

11. Head-mountable display device according claim 1, wherein the mounting structure is configured to rest less than 40% of the weight of the head-mountable display device on the nose of the user.

12. Head-mountable display device according to claim 1, wherein the mounting structure is configured to carry a weight of the first display.

13. Head-mountable display device according to claim 1, wherein the mounting structure comprises a headband.

14. Head-mountable display device according claim 1, further comprising an energy storage device configured to provide a power supply for the first display.

15. Head-mountable display device according to claim 14, wherein the energy storage device is attachable to a part of the user except the head.

16. Head-mountable display device according to claim 1, wherein the mounting structure is further configured to allow at least partial removal of the first display from the field of view of the user.

17. Head-mountable display device according to claim 16, wherein the mounting structure is configured to remove the first display automatically in response to an identified event.

18. Head-mountable display device according to claim 17, wherein the mounting structure further comprises a hinge configured to at least partially remove the first display from the field of view of the user, wherein the first display is mechanically connected to the hinge.

19. Head-mountable display device according claim 1, wherein the mounting structure is configured to allow an adjustment of a position of the first display to an interpupillary distance of the user.

20. Head-mountable display device according claim 1, wherein the head-mountable display device is configured to allow a direct line of sight from a first eye of the user to the object in a field of view of the user outside of the first display while the display direction is aligned to the first eye.

21. Head-mountable display device for displaying an image received from a microscope, comprising:
- a first display configured to display a first image of a part of an object, the first image received from a microscope;
- a mounting structure configured to fasten the first display to the head of a user; and
- a first optical arrangement located in front of the first display, wherein the first optical arrangement comprises three lenses comprising a first aspheric lens, a second aspheric lens and a third aspheric lens, wherein the first aspheric lens is the lens of the three lenses closest to the first display, wherein the second aspheric lens is arranged between the first aspheric lens and the third aspheric lens, wherein each lens of the three lenses comprises a first surface and a second surface, wherein the surfaces of the three lenses represent a sequence of surfaces, wherein the sequence of surfaces comprises a first spherical surface followed by a first aspherical surface followed by a second spherical surface followed by a second aspherical surface followed by a third spherical surface followed by a third aspherical surface.

22. Method for displaying an image received from a microscope, comprising:
- receiving a first image of a part of an object from a microscope, displaying the first image on a first display of a head-mountable display device fastened to a head of the user by a mounting structure of the head-mountable display device, wherein the head-mountable display device is configured to allow a direct line of sight from a first eye of the user to the object in a field of view of the user outside of the first display while the user is watching the first display through a first optical arrangement, if the head-mountable display device is fastened to the head of a user by a mounting structure, wherein an angle between a display direction and the direct line of sight is less than 50°, wherein the display direction is orthogonal to the first display, wherein the first optical arrangement located in front of the first display and comprises at least one lens, wherein the head-mountable display device is configured to allow the direct line of sight over a field of at least 180° around the first display, wherein the first optical arrangement comprises at least three lenses and each lens of the at least three lenses comprise different glass material.

\* \* \* \* \*